Feb. 8, 1966     J. M. STEVENS     3,233,925

TUBE COUPLING

Filed June 29, 1964     2 Sheets-Sheet 1

INVENTOR
JOE M. STEVENS

BY
Whittemore, Hulbert & Belknap
ATTORNEYS

Feb. 8, 1966  J. M. STEVENS  3,233,925
TUBE COUPLING
Filed June 29, 1964  2 Sheets-Sheet 2
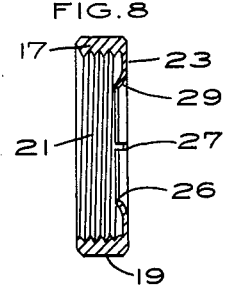
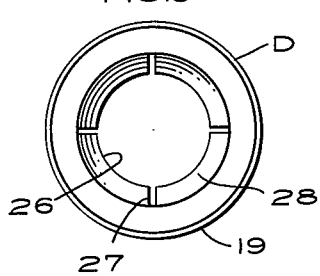
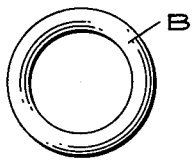
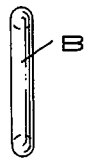
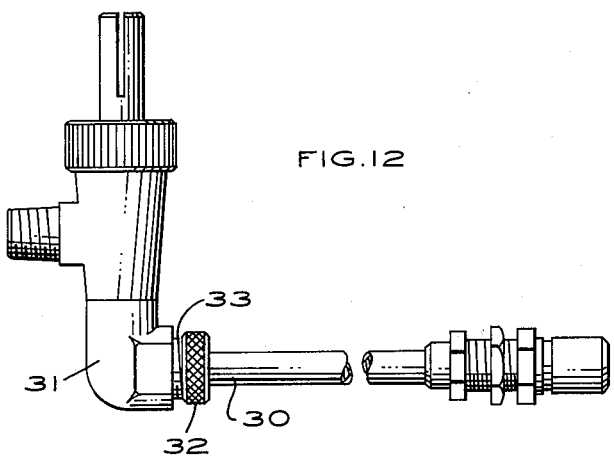
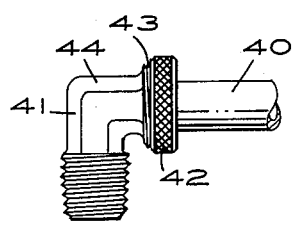
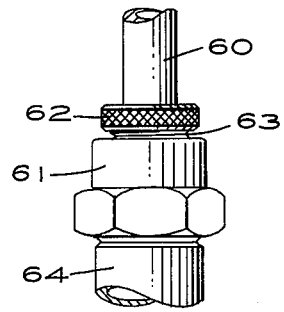
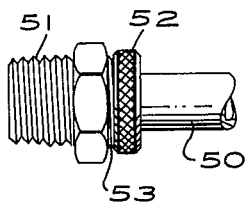
INVENTOR
JOE M. STEVENS
BY
Whittemore, Hulbert & Belknap
ATTORNEYS 3,233,925
TUBE COUPLING
Joe M. Stevens, Mitchell, Ind., assignor to The Roberts Brass Manufacturing Co., Mitchell, Ind., a corporation of Michigan
Filed June 29, 1964, Ser. No. 378,601
1 Claim. (Cl. 285—340)

This invention relates generally to tube couplings, and refers more particularly to an efficient means for coupling a tube to a fitting.

One of the essential objects of the invention is to provide a tube coupling wherein a cap threadedly engageable with the fitting, is provided with a radially extending annular flange having means for gripping tightly and effectively holding a tube in fixed assembled relation to such fitting.

Another object is to provide a tube coupling wherein a resilient O-ring having an inside diameter smaller than the outside diameter of the tube is held within a counterbore in the fitting by the radially extending annular flange aforesaid to provide a fluid-tight seal with said tube.

Another object is to provide a tube coupling wherein the diameter of the opening in the radially extending annular flange is smaller than the outside diameter of the tube, and wherein said flange is provided at the edges of the opening therein with four equidistantly spaced radially extending slits or slots which enable the portions of the flange between said slits or slots to yield inwardly slightly when a tube is inserted or pushed inwardly through the opening in said flange into the fitting, and which permits such portions to thereafter grip tightly and effectively hold the tube against displacement.

Another object is to provide a tube coupling wherein the free ends of the portions aforesaid of the radially extending annular flange are curved inwardly slightly and are tapered to facilitate the insertion of the tube into the cap, and thereafter are adapted to bite into the tubes to effectively retain the latter against displacement.

Another object is to provide a tube coupling that is simple in construction, economical to manufacture, and efficient in use.

Other objects, advantages and novel details of construction of this invention will be made more apparent as this description proceeds, especially when considered in connection with the accompanying drawings wherein:

FIGURE 8 is a vertical sectional view through the cap illustrated in FIGURE 7.

FIGURE 9 is an outside end view of the cap illustrated in FIGURE 7.

FIGURE 10 is an elevational view of one of the O-rings.

FIGURE 11 is an edge elevational view of the O-ring illustrated in FIGURE 10.

FIGURE 12 is an elevational view of a fitting or housing of a valve assembly and showing a tube coupled thereto.

FIGURE 13 is an elevational view of a fitting or tube elbow and showing a tube coupled thereto.

FIGURE 14 is an elevational view of a fitting or enlarged pipe and showing a tube coupled thereto.

FIGURE 15 is an elevational view of a fitting or adapter and an enlarged pipe connected thereto, and showing a tube coupled to the adapter.

Figure 1:
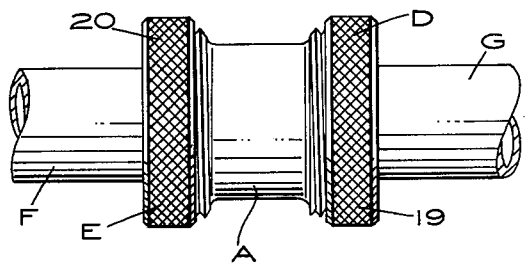
FIGURE 1 is an elevational view of a fitting, two lengths of tubing extending into the fitting, and two caps threadedly engaging opposite ends of the fitting.
Figure 3:
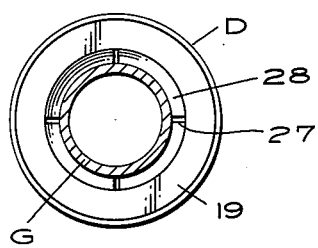
FIGURE 3 is an end view of the fitting and one of the caps illustrated in FIGURE 1.
Figure 2:
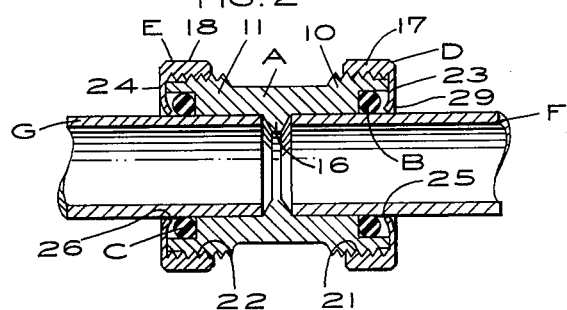
FIGURE 2 is a vertical longitudinal sectional view through the fitting, through two O-rings within counterbores at opposite ends of the fitting, and through two caps threadedly engaging opposite ends of the fitting, and showing two lengths of tubing extending through openings in the flanges of the caps, through the O-rings and into the fitting.
Figure 4:
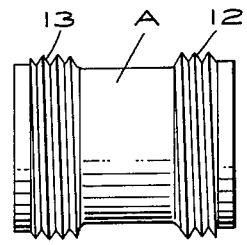
FIGURE 4 is an elevational view of the fitting.
Figure 6:
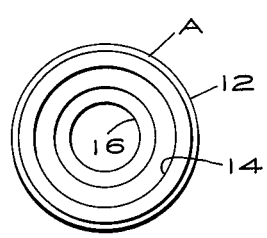
FIGURE 6 is an end view of the fitting illustrated in FIGURE 4.
Figure 5:
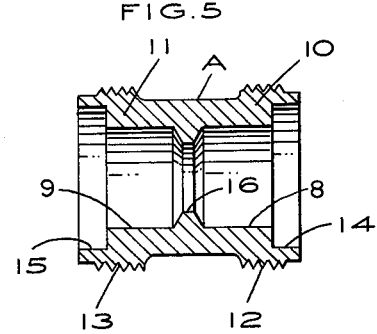
FIGURE 5 is a vertical longitudinal sectional view through the fitting illustrated in FIGURE 4.
Figure 7:
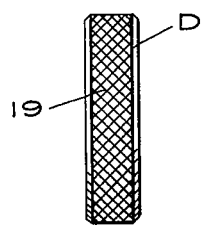
FIGURE 7 is an elevational view of one of the caps.

Referring now the the drawings, A is a tubular fitting, B and C respectively are O-rings, D and E respectively are caps, and F and G respectively are lengths of tubing of a tube coupling embodying my invention.

As shown, the tubular fitting A has interiorly thereof two axially extending bores 8 and 9 respectively, has outwardly enlarged annular end portions 10 and 11 respectively of uniform diameter provided with external threads 12 and 13 respectively, and has interiorly thereof in said enlarged end portions 10 and 11 respectively counterbores 14 and 15 respectively of L cross section that open outwardly through said end portions 10 and 11 respectively. Such fitting A also has interiorly thereof at a point substantially midway beween said counterbores 14 and 15 an inwardly projecting integral annular flange 16 that is substantially V-shape in cross section. Although the fitting A may be made from any suitable material, it is preferably made from brass.

The O-rings B and C respectively are similar in construction and are preferably made from resilient material such as neoprene, rubber or rubber composition. These O-rings B and C respectively are received within the counterbores 14 and 15 respectively in the fitting A. Preferably the outside diameter of each of the O-rings is substantially equal to the inside diameter of each of the counterbores 14 and 15 respectively, while the inside diameter of each of such O-rings B and C is initially smaller than the outside diameter of the lengths F and G respectively of tubing to provide fluid-tight seals therewith.

The caps D and E are similar in construction and are preferably made from steel or bronze. As shown, the caps have annular portions 17 and 18 respectively provided with knurled exterior surfaces 19 and 20 respectively and provided with internal threads 21 and 22 respectively for engagement with the external threads 12 and 13 respectively of the fitting. Such annular portions 17 and 18 respectively have at their outer edges radially extending annular flanges 23 and 24 respectively that are relatively thin and that extend beside and retain the O-rings B and C respectively within the counterbores 14 and 15 respectively in the fitting A. Preferably, the radially extending annular flanges 23 and 24 respectively have circular openings 25 and 26 respectively which are smaller in diameter than the outside diameter of the lengths F and G respectively of tubing. Such flanges 23 and 24 respectively are provided at the edges of the openings 25 and 26 respectively therein with four equidistantly spaced radially extending slits or slots 27 which enable the portions 28 of the annular flanges between said slits or slots to yield inwardly slightly when the tubes F and G respectively are inserted or pushed inwardly through the openings 25 and 26 respectively in said flanges into the fitting A, and which permit such portions 28 to thereafter grip tightly and effectively hold the tubes F and G respectively against displacement. The free ends 29 of the portions 28 aforesaid of the radially extending annular flanges 23 and 24 respectively are curved inwardly slightly and are tapered to facilitate the insertion of the tubes F and G respectively into the fitting A. Thereafter, such inwardly curved free ends 29 of the portions 28 of the flanges 23 and 24 respectively are adapted to bite into the tubes F and G respectively to effectively retain the latter against displacement.

The lengths F and G respectively of tubing are similar in construction and are preferably made from copper. Such lengths of tubing are inserted or pushed inwardly through the openings 25 and 26 respectively in the flanges 23 and 24 respectively of the caps D and E respectively and thence through the O-rings B and C respectively and into the bores 8 and 9 respectively in the fitting A. The inwardly projecting annular flange 16 of the fitting A serves as a common abutment or stop for such lengths F and G respectively of tubing during the insertion thereof.

In the present instance, the depth of each counterbore 14 and 15 respectively must be greater than the cross sectional thickness of each O-ring B and C respectively to prevent the inwardly curved free ends 29 of the portions 28 of the flanges 23 and 24 respectively from lifting the O-rings B and C respectively off of the lengths F and G respectively of tubing when assembling the caps D and E on the tubular fitting A.

In use, the O-rings B and C are initially inserted or placed within the counterbores 14 and 15 respectively in the fitting A, and the caps D and E respectively are then threaded upon the threaded enlarged annular end portions 10 and 11 respectively of the fitting A. The tubes F and G are then inserted or pushed inwardly through the openings 25 and 26 respectively in the radially extending annular flanges 23 and 24 respectively of the caps D and E, and thence through the O-rings B and C respectively and into the bores 8 and 9 respectively in the fitting A. Once assembled as described, the portions 28 of the radially extending annular flanges 23 and 24 respectively of the caps D and E respectively will grip tightly and will effectively hold the tubes F and G respectively in fixed assembled relation with said fitting A. In this connection, the inwardly curved free ends 29 of the portions 28 of the flanges 23 and 24 respectively are adapted to bite into the tubes F and G respectively to effectively retain the latter against displacement. Such flanges 23 and 24 respectively will also hold the O-rings B and C respectively within the counterbores 14 and 15 respectively in the fitting A. Moreover, the O-rings B and C respectively within the counterbores 14 and 15 respectively in the fitting A will provide fluid-tight seals with the tubes F and G respectively. Thus, I have provided a very efficient tube coupling that may be used in any gas or water systems.

In FIGURE 12, I have shown a tube 30 coupled to a fitting or housing 31 of a valve assembly by a cap 32 that is similar in construction to the caps D and E respectively. Such cap 32 threadedly engages an exteriorly threaded enlarged nipple 33 of the housing 31 and has a radially extending annular flange (not shown) that is similar in construction to the flanges 23 and 24 respectively of the caps D and E respectively and that grips tightly and effectively holds the tube 30 in fixed assembled relation with said housing 31.

In FIGURE 13, I have shown a tube 40 coupled to a fitting or tube elbow 41 by a cap 42 that is similar in construction to the caps D and E respectively. Such cap 42 threadedly engages an exteriorly threaded outwardly enlarged annular end portion 43 of an arm 44 of the elbow 41 and has a radially extending annular flange (not shown) that is similar in construction to the flanges 23 and 24 respectively of the caps D and E respectively and that grips tightly and effectively holds the tube 40 in fixed assembled relation with the annular end portion 43 of the arm 44 of the elbow 41.

In FIGURE 14, I have shown a tube 50 coupled to a fitting or enlarged pipe 51 by a cap 52 that is similar in construction to the caps D and E respectively. Such cap 52 threadedly engages an exteriorly threaded end portion 53 of the enlarged pipe 51 and has a radially extending annular flange (not shown) that is similar in construction to the flanges 23 and 24 respectively of the caps D and E respectively and that grips tightly and effectively holds the tube 50 in fixed assembled relation with the enlarged pipe 51.

In FIGURE 15, I have shown a tube 60 coupled to a fitting or adapter 61 by a cap 62 that is similar in construction to the caps D and E respectively. Such cap 62 threadedly engages an exteriorly threaded end portion 63 of the adapter 61 and has a radially extending annular flange (not shown) that is similar in construction to the flanges 23 and 24 respectively of the caps D and E respectively and that grips tightly and effectively holds the tube 60 in fixed assembled relation with the adapter 61. Such adapter 61 in turn is threaded upon an enlarged tube or pipe 64.

What I claim as my invention is:

A tube coupling comprising a tubular fitting having an exteriorly threaded annular end portion, having interiorly of and opening outwardly through said end portion a tube receiving bore and a counterbore, and having interiorly of said fitting in longitudinally spaced relation to said counterbore an inwardly projecting annular flange, a tube extending into said bore and abutting said flange, a resilient O-ring within said counterbore, encircling and having fluid-tight sealing engagement with said tube, and bearing against and having sealing engagement with the walls of said counterbore, the axially extending wall of said counterbore being of greater axial length than the cross sectional thickness of said O-ring, and means for holding both said tube and said O-ring against displacement including a cap having an interiorly threaded annular portion threadedly engaging the exteriorly threaded annular end portion of said fitting, and having at the outer edge of said interiorly threaded annular portion an integral radially inwardly extending resilient relatively thin annular flange extending across the adjacent end portion of said fitting and closing the outer end of said counterbore, the radially inwardly extending annular flange of said cap being disposed upon the outer side of said counterbore and engaging said axially extending wall as a stop, said radial flange being operable as a retainer for said O-ring and having at its inner end portion an angularly inwardly sectionalized edge biting into the exterior surface of said tube.

References Cited by the Examiner

UNITED STATES PATENTS 2,182,797  12/1939  Dillon _____ 285—104 X
2,831,711  4/1958  Leadbetter _____ 285—238

FOREIGN PATENTS 619,746  3/1949  Great Britain.
691,372  4/1953  Great Britain.
859,598  1/1961  Great Britain.
916,070  1/1963  Great Britain.

CARL W. TOMLIN, Primary Examiner.

EDWARD C. ALLEN, Examiner.

T. A. LISLE, Assistant Examiner.